E. P. WARNER.
Improvement in Electrical Apparatus for Indicating Depth of Liquids in Tanks.
No. 130,611. Patented Aug. 20, 1872.
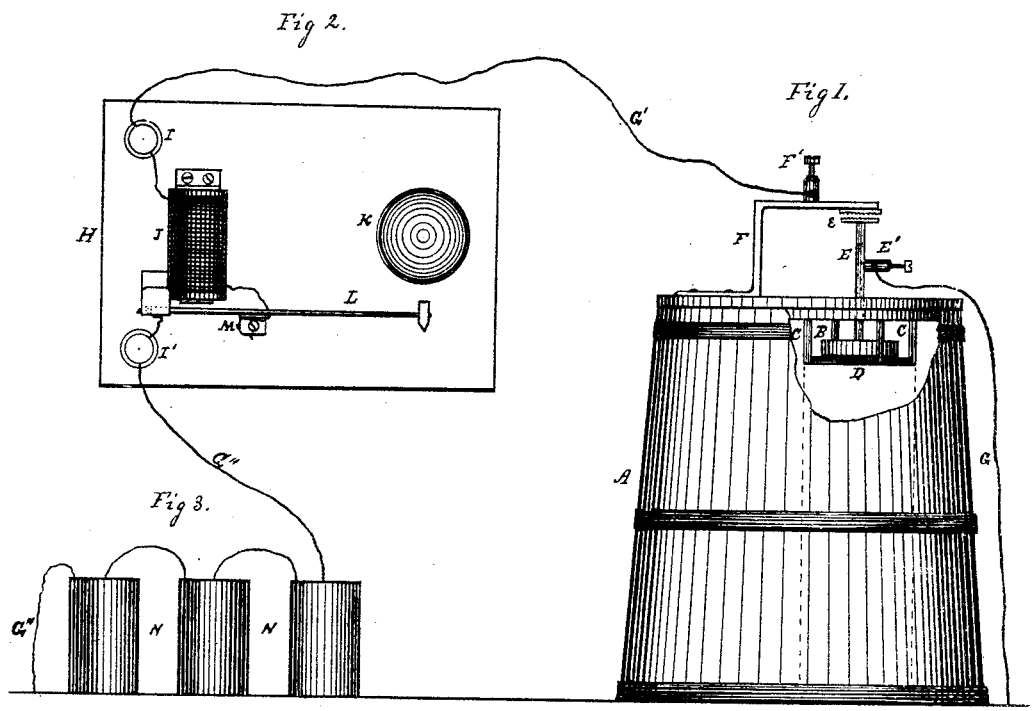

UNITED STATES PATENT OFFICE.

ELERY P. WARNER, OF GALESBURG, ILLINOIS, ASSIGNOR OF ONE-HALF HIS RIGHT TO F. H. TUBBS, OF SAME PLACE.

IMPROVEMENT IN ELECTRICAL APPARATUS FOR INDICATING DEPTH OF LIQUIDS IN TANKS.

Specification forming part of Letters Patent No. 130,611, dated August 20, 1872.

SPECIFICATION.

*To whom it may concern:*

Be it known that I, ELERY P. WARNER, of Galesburg, in the county of Knox and State of Illinois, have invented certain new and useful Improvements in Electrical Apparatus for Indicating the Depth of Liquid in Tanks or Reservoirs, of which the following is a full, clear, and exact description, which will enable others skilled in the art to which my invention appertains to make and use the same, reference being had to the accompanying drawing forming part of this specification, and in which—

Figure 1 represents an elevation of a tank or reservoir provided with a float device for operating an electric signal; Fig. 2, a front elevation of an electric signal; and Fig. 3, an elevation of the local battery, acting in connection with the float device in the operation of the signal.

The object of my invention is to facilitate the means of ascertaining the depth of liquid in distant tanks or reservoirs; and to that end it consists in providing the tank or reservoir with a float device operating in connection with either an electric alarm signal or an electric visual signal, or with both, in such a manner that an alarm will be sounded when the tank or reservoir is full, or the depth of the liquid indicated by the visual signal; or so that both the alarm and visual signal will perform their functions in connection with each other. Heretofore, the depth of the liquid in distant tanks and reservoirs has been most conveniently ascertained, so far as I am aware, by means of visual signs or signals upon or near the tanks or reservoirs; whereas I am enabled to place the signals where they may be conveniently heard or inspected at any time.

In the drawing, A represents a tank or reservoir, such as is commonly used at railway stations for the purpose of supplying the locomotive engines with water, or for similar purposes. B is a float of cork or other suitable material; or this float may be made of metal, in the form of an air-tight box or chamber. C C are guide-ways arranged within the tank so as to confine the float to a vertical movement as it rises and falls. When an alarm signal is used to determine when the tank is full, the float may be supported near the top of the tank, as shown at D; but when a visual signal is used to indicate the depth of the liquid at any time, the guide-ways should extend to the bottom of the tank, as shown by the dotted lines in Fig. 1. E is a metallic post attached to the float B, and moving through an opening in the top of the tank as the float rises and falls. This opening in the cover of the tank may serve as a sufficient guide for the float, but the use of the guide-way C C is recommended. $e$ is a metallic plate attached to the top of the post E, and, preferably, having a roughened upper surface. E' is a metallic binding-post attached to the post E. F is a metallic support, and F' is a metallic binding-post supported by it. The forward end of the support F is, preferably, roughened, as shown, and extends over the plate $e$, so that the latter will come in contact therewith when the tank is full. G is a wire attached to the post E', and communicating with the ground. G' is a wire attached to the post F', and communicating with either an electric alarm signal or with an electric visual signal for the purposes mentioned.

In order that the operation of my float device, when used in connection with an electric alarm signal, may be fully understood, I will briefly describe its operation with a simple device of that class. H is an electric alarm signal, preferably arranged upon the wall of the engineer's room, whose duty it is to keep the tanks filled. The wire G' enters the alarm at I, which is a metallic binding-post. J is an electro-magnet, and one end of its coil communicates with the wire G'. K is a bell or gong. L is an armature provided with a small hammer, and so pivoted that the hammer will vibrate to and from the gong as the current is opened and closed. M is a metallic rest which supports the hammer. I' is a metallic binding-post, and N is a battery. One end of the coil of the magnet J communicates with the rest M, as shown. A wire, G'', also connects with the armature L, and passes from thence through the binding-post I' to the battery, and from thence to the ground. Instead of forming a "ground circuit" in this manner, the wire G'' may be carried from the battery to the post E', and the wire G dispensed with; thus forming a "metallic circuit." The vibration of the hammer is such, preferably, that it will strike the gong without striking the pole of the magnet J. As the plate e comes in contact with the end of the support F, the circuit is complete and the hammer is drawn away from the rest M and strikes the gong. This breaks the circuit, and the hammer falls back on the rest M, it being understood that the alarm device is so arranged that the attraction of gravitation will draw the hammer down. As soon as the hammer strikes the rest the circuit is again full, and the hammer again strikes the gong, and continues to vibrate in this manner so long as the plate e and the support F are in contact or until the circuit is broken for the purpose of causing the alarm to cease striking. This alarm calls attention to the fact that the tank is full.

In order to ascertain the depth of the liquid within the tank, an ordinary galvanometer may be used, either with or without an alarm-signal, wires of different resistances being arranged near the line of movement of the post E, each communicating with the ground wire G, or with the return wire when a "metallic circuit" is used, and such other necessary or expedient changes being made as will readily suggest themselves to those familiar with the construction and operation of a galvanometer.

I do not here claim that my invention relates either to the alarm signal or to the visual signal herein described and referred to, except as the same are constructed and arranged to operate in connection with a tank and float device for the purposes set forth; but

Having thus described my invention, what I claim as new, and desire to secure by Letters Patent, is—

In combination with the tank A and an electro-mechanical alarm signal, the float device B, for the purpose of closing the circuit and operating the signal when the tank is full; all constructed and arranged substantially as shown and described.

The foregoing specification signed by me this 6th day of April, A. D. 1872.

ELERY P. WARNER.

Witnesses:
N. C. GRIDLEY,
F. F. WARNER.